United States Patent [19]
Dickstein

[11] 3,904,469
[45] Sept. 9, 1975

[54] METHOD OF MAKING A BONDED HELMET STRUCTURE

[75] Inventor: George Dickstein, Shaket Heights, Ohio

[73] Assignee: Sports Products Corporation, Cleveland, Ohio

[22] Filed: Nov. 30, 1973

[21] Appl. No.: 420,630

Related U.S. Application Data

[63] Continuation-in-part of Ser. No. 352,205, April 18, 1973.

[52] U.S. Cl............................ 156/245; 2/3 R; 46/2; 156/272
[51] Int. Cl.[2]...................... B29C 9/00; B29C 24/00
[58] Field of Search ............ 156/242, 245, 63, 272, 156/292, 293, 397, 298, 305; 264/241, 245, 248, 249, 250; 2/3, 5, 6, 173.5, 205; 46/2

[56] References Cited
UNITED STATES PATENTS

| | | | |
|---|---|---|---|
| 2,642,911 | 6/1953 | DeShazor............................ | 156/272 |
| 2,853,708 | 9/1958 | Austin.................................... | 2/3 R |
| 2,855,604 | 10/1958 | Austin.................................... | 2/3 R |

*Primary Examiner*—Caleb Weston
*Attorney, Agent, or Firm*—Lowell Gene Wise

[57] ABSTRACT

A method of manufacture is disclosed for thermoplastic hollow bodies such as a coin bank, which comprises: molding a hollow shell portion with a thickened edge extending along a portion of the shell and outwardly offset from the shell with a recess adapted to receive a second molded portion in mating relationship; integrally molding a second flat portion having complementary shaped annular edges and an elongated extension such as a bill, wherein the elongated extension is attached at an inner edge thereof to the flat portion. The extension has a thickened edge extending around an outer edge of the extension and terminating at an inner edge of the extension at points adjacent to the flat portion. The flat portion has integrally molded therewith an arcuate projection corresponding to the shell edge shape and spaced inwardly on the flat portion from the inner edge of the elongated extension and adapted to mate with an inner surface of the shell. The relatively thin molded sections are then assembled and bonded to form a housing or container. The hollow portion may be in the shape of a helmet crown with a coin slot. The flat portion may be in the form of a flat base portion having an access port. The structure can be bonded by ultrasonic energy or solvent welding. The invention is especially useful for manufacturing two-color billed baseball helmet-type enclosures suitable for use as a coil bank, where two sections are molded from different colored thermoplastic synthetic resin and thereafter bonded.

5 Claims, 7 Drawing Figures

PATENTED SEP 9 1975　3,904,469

METHOD OF MAKING A BONDED HELMET STRUCTURE

REFERENCE TO CO-PENDING APPLICATION

This application is a continuation-in-part of U.S. Pat. application Ser. No. 352,205 filed Apr. 15, 1973 entitled "Helmet Bank with Integral Bottom."

BACKGROUND OF THE INVENTION

This invention relates to methods of manufacture for housings, containers, enclosures or the like made with rigid thermoplastic resins. Coin banks which simulate the shape of a protective baseball helmet can be made from molded thermoplastic materials such as synthetic polymers including addition hompolymers or interpolymers of ethylenically unsaturated compounds such as styrene, olefins, polypropylene, vinyl chloride, or acrylonitrile. Other suitable heat-fusible thermoplastic resins include ABS-type resins, polycarbonates, etc. These materials may be injection molded to any desired shape to form a hollow portion which may be bonded to a closure member thereby forming a hollow body. The low-cost injection molding processes eliminate the need for expensive blow molding of hollow articles. A main disadvantage of the injection molding technique in the manufacture of helmet-like enclosed structures is in the number of steps required to obtain a two-color helmet with a different color used for the crown and bill sections. Where the crown and bill are integrally molded in one step of the operation in order to obtain a different color bill, it is necessary to mask or stencil the article and overcoat part of the molded article with another color as by spray painting, etc. This introduces another operation in the manufacturing process and does not obtain the desired product with low cost and efficient manufacturing.

SUMMARY OF THE INVENTION

The present invention relates to manufacture of an enclosure of thermoplastic synthetic resins in the shape of a molded ellipsoidal hollow portion and a planar base closure portion having an outward extension or bill portion. A hollow crown piece is molded in one color with a lower thickened edge extending along a rear portion of the crown forward to a juncture with a corresponding first thickened edge on the bill portion, wherein the thickened edge of the crown portion is outwardly offset from the crown and recessed to register with the planar base closure portion. An integrally-molded front bill portion and substantially planar base closure portion corresponds in shape to the elliptical edge of the crown and is molded in different uniform color with thermoplastic resin. The bill portion is attached at an inner edge thereof by integral molding with the base closure portion. The bill has a thickened edge corresponding in cross section to the thickened edge of the crown and extending around an outer edge of the bill toward the inner edge of the bill. Where the outer edge is adjacent to the base closure portion, the thickened edges of the crown and bill are aligned. The base closure has integrally molded therewith an arcuate upwardly extending projection corresponding to the front crown shape and spaced inwardly on the base closure from the inner bill edge. The projection is adapted to mate with an inner surface of the crown portion. After assembling the unthickened front edge of the hemispheroidal shell portion in registration with the flat portion and the annular projection to provide an overlapping joint, the pieces are united by bonding. A rigid thermoplastic structure is obtained using relatively thin-walled materials, and a unitary housing is obtained by a simple manufacturing technique. A feature of the invention provides alignment of the thickened edge portions to provide a generally continuous appearance around the bill and rear crown portions of the enclosure.

These and other features and advantages of the invention will be understood in conjunction with the following description and drawings.

DESCRIPTION OF PREFERRED EMBODIMENTS

Figure 1:
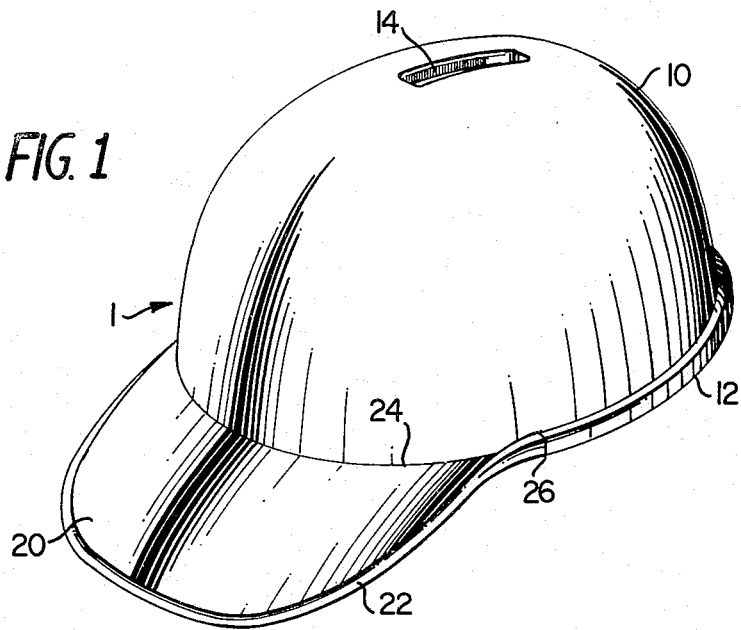
FIG. 1 is a three-quarter front perspective view of an assembled helmet-type coin bank according to the present invention.
Figure 2:
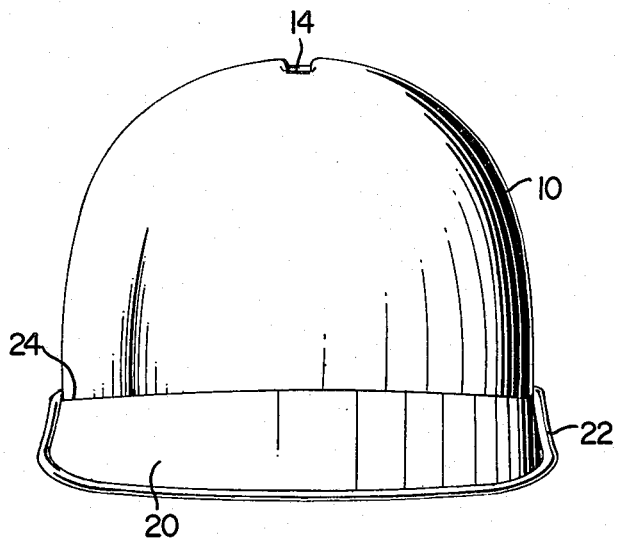
FIG. 2 is a front elevational view thereof.
Figure 3:
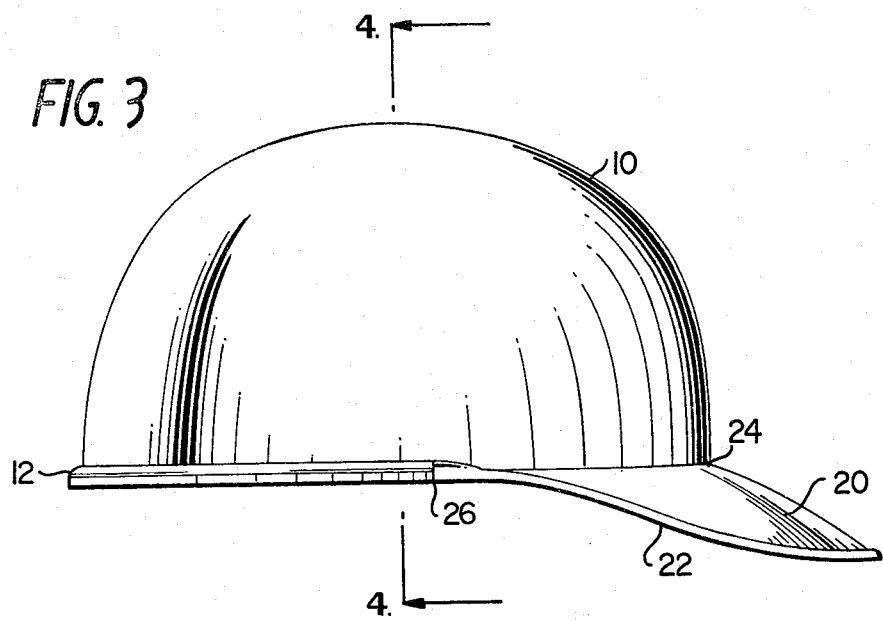
FIG. 3 is a side elevational view thereof.

Referring to FIGS. 1, 2 and 3, a plastic helmet bank 1 is shown in perspective, front elevation view, and side elevation view, respectively. A hollow shell portion 10 is molded in ellipsoidal or hemispheroidal shape, forming a thin crown portion. A thickened bottom edge 12 extends along a rear portion of the crown or shell 10. The crown portion 10 is provided with a top coin slot 14 adapted to receive coins or the like in the hollow enclosure. The crown portion 10 is molded with thin walls from a uniformly colored thermoplastic resin such as polystyrene. A front bill portion 20, molded of a different color of thermoplastic resin, has a thickened edge 22 extending around an outer peripheral edge of the bill portion 20, terminating at an inner edge 24 of the bill portion at lateral points 26 where the outer edge of the bill portion 20 forms a juncture with the corresponding thickened edge 12 of the crown portion 10. Inner edge 24 intersects the first and second thickened edges 12 and 22 at these points.

Figure 5:
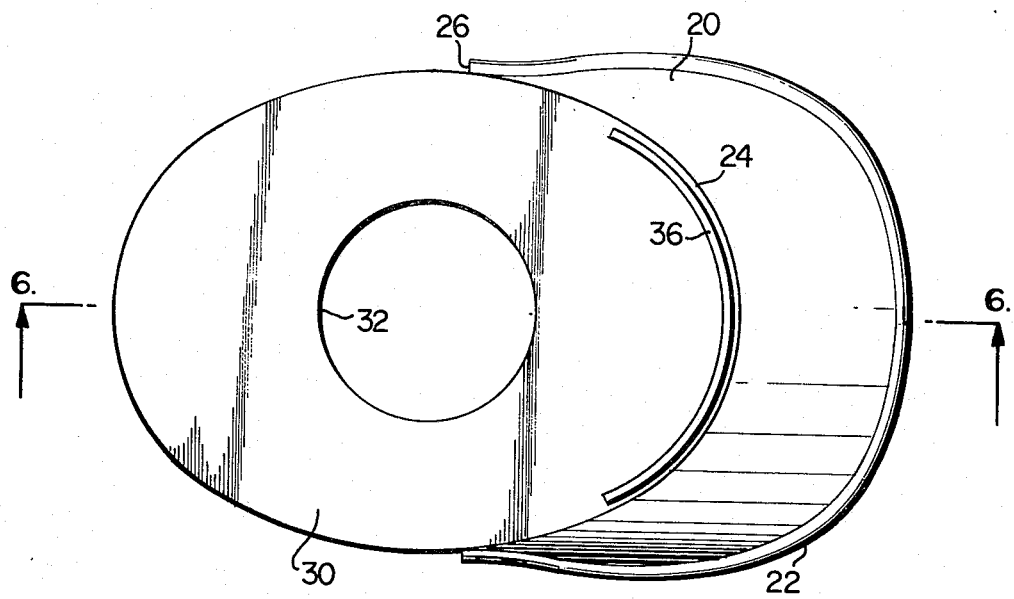
FIG. 5 is a plan view of an integrally molded base closure and bill portion according to the present invention.
Figure 6:
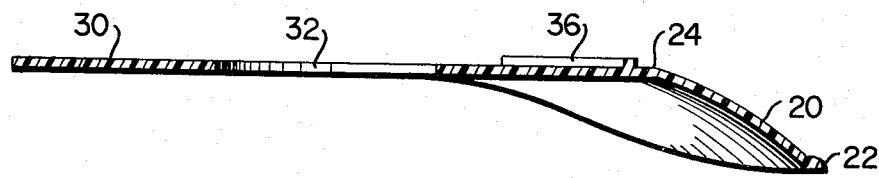
FIG. 6 is a vertical cross-sectional view thereof taken along lines 6—6 of FIG. 5.

The present method for manufacture for an enclosure of thermoplastic synthetic resin includes a step of integrally molding the front bill portion 20 with a planar base closure portion 30, as shown in FIGS. 5 and 6. The base portion 30 is substantially flat or planar in shape, and the bill portion 20 is an elongated extension attached at an inner edge 24 thereof to the flat portion 30. The bill portion 20 extends outwardly from the crown 10 and base 30 and slopes downwardly from the inner edge 24. The horizontal planar base closure portion has complementary-shaped annular edges corresponding in a substantially elliptical shape to the crown portion 10.

Figure 4:
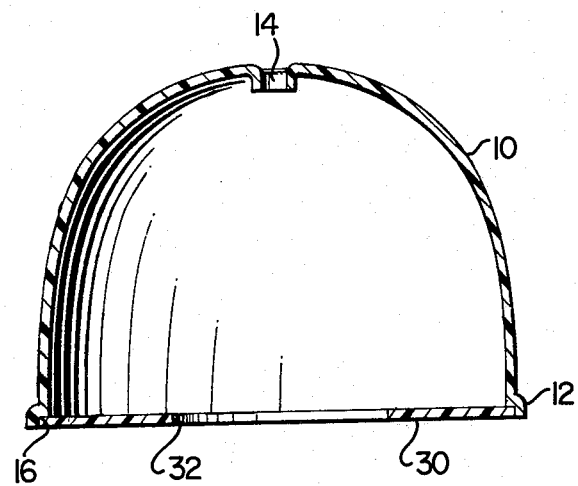
FIG. 4 is a vertical cross-sectional view of the enclosure taken along lines 4—4 of FIG. 3.

Referring to FIG. 4 of the drawing, the relationship of the flat portion 30 to the crown portion 10 is shown in detail and the thickened edge 12 of the crown portion 10 is shown offset, extending outwardly from the shell 10 and adapted with a recess 16 to receive the flat molded portion 30 in mating relationship. Recess 16 can be an L-shaped channel integrally molded on the bottom of shell 10 in a configuration corresponding to a generally elliptical shape for registering with the planar base 30.

The bill portion 20 and planar base closure portion 30 are integrally molded from a uniformly colored thermoplastic material such as polystyrene. The planar base portion is provided with an access port 32 for removing contents of the hollow enclosure 1. The access port 32 may be provided with a resilient plug, not shown. A typical plug would be a tabbed insert disc of elastomeric or soft polymeric material.

In the assembled article, the thickened edge 12 of the shell portion 10 has a substantially uniform outer surface which is aligned with the corresponding thickened edge 22 of the bill portion 20 to provide a generally continuous appearance around the bill and rear crown portions of the housing. The cross section of the bill edge 22 can be gradually changed from the bill front to the juncture points 26 to give a smooth contour flow and which gives the appearance of a continuous thickened outer and bottom edge around the entire bottom of the helmet structure.

As shown in FIGS. 5 and 6, the base closure portion 30 has integrally molded therewith an arcuate upwardly extending projection 36 corresponding to the crown shape and spaced inwardly on the base closure flat portion 30 from the annular inner bill edge 24. The projection 36 is adapted to mate with an unthickened inner surface of the crown portion 10. The spacing would be selected to correspond substantially to the thickness of the crown portion 10, usually 1 to 3 millimeters. The height of the annular projection is not critical so long as there is sufficient dimension to provide an overlapping joint, whereby the pieces can be united by bonding. This provides a rigid thermoplastic structure using relatively thin-walled materials, and a unitary housing can be achieved using a relatively simple manufacturing technique. The arcuate projection extends adjacent the inner edge 24 of the bill portion 20 over a major portion of the inner bill edge between juncture points 26.

Figure 7:
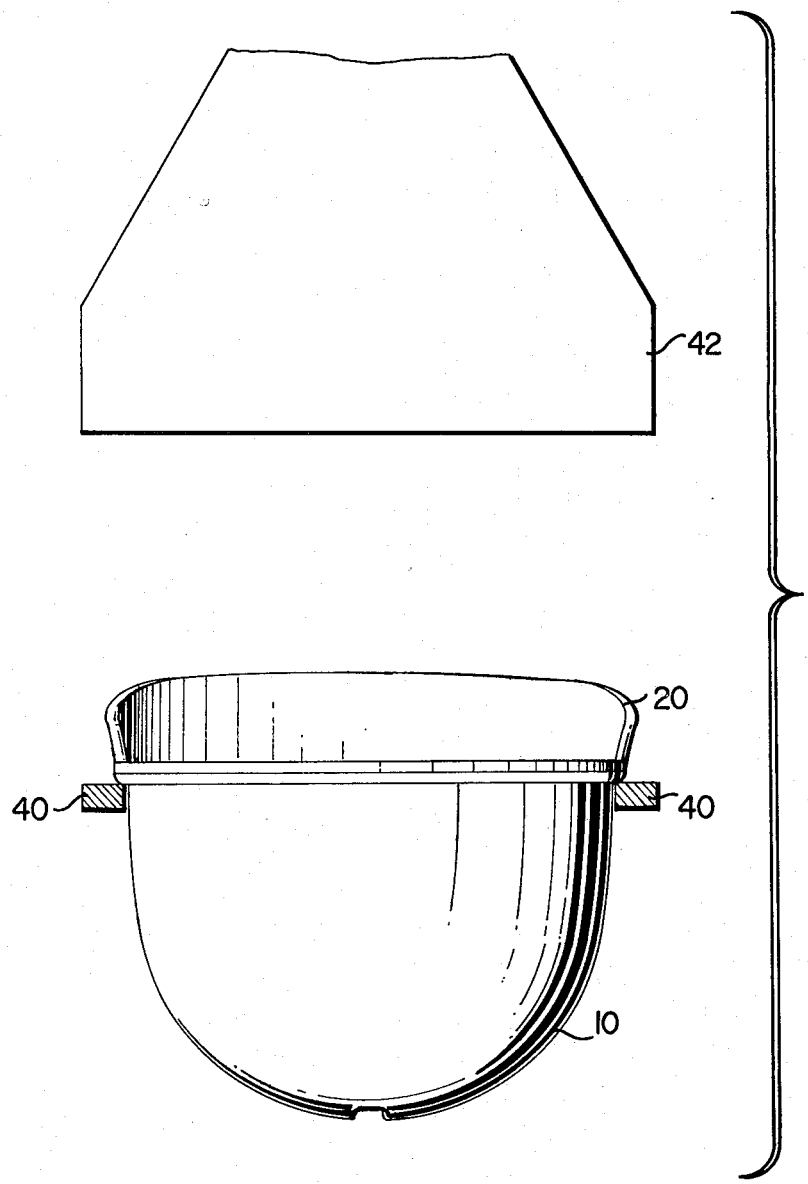
FIG. 7 is a view showing the method of assembly and ultrasonic bonding according to the present invention.

A bonding step wherein the shell portion 10 is joined to the integral bill and base closure portions 20 and 30 can be performed by alternative operations. A preferred method of binding the molded crown portion to the integral bill and base closure portion is shown schematically in FIG. 7, wherein the helmet structure is assembled and held in an inverted position with the shell portion contained within a horizontal C-shaped support 40. This holds the assembled unbonded helmet structure in the inverted position during ultrasonic bonding. An ultrasonic head 42 is shown schematically in FIG. 7. This fuses the base portion 30 to the recess 16 while fusing the front crown portion to the projection 36 and base 30. Bonding can also be achieved by solvent welding.

As seen from FIGS. 1, 2 and 3 the assembled and bonded structure gives a clean line of separation 24 between the inner edge portion of the bill portion and the differently colored crown section 10. This manufacturing method provides sharp contrast between two-color enclosures of the type described.

While the invention has been described by reference to particular example, there is no intent to limit the inventive concept except as set forth in the following claims.

I claim:

1. A method of manufacture for an enclosure of thermoplastic synthetic resin in the shape of a two-color billed helmet structure having
   a molded ellipsoidal hollow crown portion, a front bill portion, and a horizontal planar base closure portion comprising
   integrally molding the front bill portion and planar base closure portion corresponding in substantially elliptical shape to the crown portion in a uniformly colored one-piece molded bill part wherein the bill portion is attached at an inner edge thereof to the base closure portion; said bill portion having a first thickened edge extending around an outer peripheral edge of the bill portion and terminating at the inner edge of the bill at points where the outer edge of the bill portion is adjacent to the base closure portion; said base closure having integrally molded therewith an arcuate upwardly extending projection corresponding to the crown shape and spaced inwardly on the base closure from the inner bill edge and adapted to mate with an inner surface of the crown portion;
   molding the hollow crown portion in a different uniform color with a lower second thickened edge extending along a rear portion of the crown forward to a juncture with a corresponding first thickened edge on the bill portion, said second thickened edge outwardly offset from the crown and being recessed to register with the planar base closure portion;
   assembling the helmet structure in an inverted position; and
   applying ultrasonic energy to fuse the thermoplastic resin to join the crown portion to at least the planar base closure and arcuate projection.

2. The method of claim 1 wherein the assembled helmet structure is held in an inverted position during ultrasonic bonding by a C-support adapted to receive the helmet structure.

3. The method of claim 1 wherein the base closure is provided with an access port and wherein the crown portion is provided with a top coin slot.

4. The method of claim 1 wherein the thickened edges have a substantially uniform outer surface and are aligned to provide a generally continuous appearance around the bill and rear crown portions.

5. A method of manufacture for an enclosure of thermoplastic synthetic resin in the shape of a two-color billed helmet structure having
   a molded ellipsoidal hollow crown portion, a front bill portion and a horizontal planar base closure portion comprising
   integrally molding the front bill portion and planar base closure portion corresponding in substantially elliptical shape to the crown portion in a uniformly colored one-piece molded bill part wherein the bill portion is attached at an inner edge thereof to the base closure portion; said bill portion having a first thickened edge extending around an outer peripheral edge of the bill portion and terminating at the inner edge of the bill at points where the outer edge of the bill portion is adjacent to the base closure portion; said base closure having integrally molded therewith an arcuate upwardly extending projection corresponding to the crown shape and spaced inwardly on the base closure from the inner bill edge and adapted to mate with an inner surface of the crown portion;

molding the hollow crown portion in a different uniform color with a lower second thickened edge extending along a rear portion of the crown forward to a juncture with a corresponding first thickened edge on the bill portion, said second thickened edge outwardly offset from the crown and being recessed to register with the planar base closure portion; and bonding the molded crown portion to the integral bill and base closure portions by solvent welding.

* * * * *